United States Patent [19]

Lofquist et al.

[11] Patent Number: 4,558,097

[45] Date of Patent: Dec. 10, 1985

[54] NYLON COMFORT FIBER CONTAINING POLY(N,N-DIMETHYLACRYLAMIDE)

[75] Inventors: Robert A. Lofquist, Richmond; Ian C. Twilley, Chester; Peter R. Saunders, Richmond, all of Va.

[73] Assignee: Allied Corporation, Morris Township, Morris County, N.J.

[21] Appl. No.: 609,375

[22] Filed: May 11, 1984

Related U.S. Application Data

[62] Division of Ser. No. 547,157, Oct. 31, 1983, Pat. No. 4,458,053.

[51] Int. Cl.$^4$ .................................................. C08F 8/30
[52] U.S. Cl. .............................. 525/183; 8/DIG. 21; 8/DIG. 18
[58] Field of Search .......................................... 525/183

[56] References Cited

U.S. PATENT DOCUMENTS 4,238,193  12/1980  Kisaichi et al. .................. 525/59

FOREIGN PATENT DOCUMENTS 16893   7/1966   Japan .
41744   9/1968   Japan .
42134  10/1968   Japan .

Primary Examiner—Wilbert J. Briggs, Sr.
Assistant Examiner—A. L. Carrillo
Attorney, Agent, or Firm—Richard A. Anderson

[57] ABSTRACT

This invention is a nylon fiber useful for improved comfort for wearers of apparel fabric made therefrom comprising (a) from about 5 to 15 percent by weight of poly (N,N-dimethylacrylamide) having a molecular weight which in a 25% aqueous solution gives a viscosity of from about 20 to 1 000 centipoise (0.02 to 1.0 Pa.s) at 25° C. and (b) correspondingly from about 85 to 95% by weight nylon.

1 Claim, No Drawings

NYLON COMFORT FIBER CONTAINING POLY(N,N-DIMETHYLACRYLAMIDE)

This application is a division of application Ser. No. 547,157, filed Oct. 31, 1983, now U.S. Pat. No. 4,458,053.

BACKGROUND OF THE INVENTION

This invention relates to an apparel fiber of nylon containing 5 to 15 % by weight poly(N,N-dimethylacrylamide) useful for improved comfort for wearers of apparel fabric made therefrom.

Consumers have long perceived cotton as one of the most comfortable apparel fibers, and have credited this perception largely to its moisture regain. Since the invention of nylon, researchers have sought techniques which confer to nylon an equivalent sense of comfort, and have centered this effort on increasing its moisture regain. In Japanese Publication No. 73-13 337 an N,N-dimethylacrylamide-methyl acrylate copolymer was added to polyamide spinning compositions to increase the hygroscopicity of the filaments. Also, a methyl acrylate-N,N-dimethylacrylamide copolymer was used for the same purpose in Japanese Publication No. 72-42 134. It is also known in Japanese Publication No. 72-41 744 to use poly(N,N-dimethylacrylamide) to increase the melt viscosity of polyamide. In Japanese Publication No. 77-25 895, N,N-dimethylacrylamide was grafted onto a polyester or similar polymer by radiation in the presence of a catalyst and in Japanese Publication No. 71-16893-R the graft copolymer of polyamide was an acrylamide and was taught to improve hygroscopic properties. U.S. Pat. No. 4 135 877 teaches the grafting onto a polyamide fiber of N,N'-methylenebis-acrylamide in the presence of an acid to improve hygroscopic properties. A similar teaching was found in U.S. Pat. No. 4,238,193 and a general teaching along the same lines is found in G.B. No. 1 355 846. Acrylamides are grafted onto a hollow fiber in Japanese Publication No. 55057-071.

Poly(N,N-dimethylacrylamide), hereinafter PDMAA, is prepared from a commercially available monomer and polymerizes readily using free radical initiators. The polymer is also available commercially.

SUMMARY OF THE INVENTION

This invention is a nylon fiber, useful for improved comfort for wearers of apparel fabric made therefrom, comprising (a) from about 5 to 15% of poly(N,N-dimethylacrylamide) having a molecular weight which in a 25% aqueous solution gives a viscosity of from about 20 to 1 000 centipoise (0.02 to 1.0 Pa.s) at 25° C. and (b) correspondingly from about 85 to 95% by weight nylon. The invention is also the method of preparing a nylon fiber useful for improved comfort for wearers of apparel fabric made therefrom comprising adding from about 5 to 15% by weight of poly(N,N-dimethylacrylamide) having a molecular weight which in a 25% aqueous solution gives a viscosity of from about 20 to 1 000 centipoise (0.02 to 1.0 Pa.s) at 25° C. to from about 85% to 95% by weight of caprolactam, then polymerizing the mixture conventionally, then extruding and washing the resultant polymer conventionally, then forming the resultant polymer into fiber by conventional spinning. Preferably, during the method, a grafting reaction occurs during polymerization. It is also preferable to use at least 10% poly(N,N-dimethylacrylamide) adding to the caprolactam. It is preferable to form the resultant polymer into fiber by spinning through a spinnerette hole having a length to diameter ratio of from about 4:1 to 8:1.

Nylon polymers were actually made containing up to 10% of PDMAA. Nylon fiber containing 10% PDMMA could be spun only when the molecular weight of the PDMAA was such that a 25% aqueous solution gave a viscosity of between 20 and 1 000 centipoise. When the PDMAA molecular weight was high, only nylons containing low concentrations could be spun into yarn. At 65% relative humidity and 68° F. (20° C.) and at 95% relative humidity and 90° F. (32° C.), nylon fibers containing 10% PDMAA had a moisture regain similar to that of cotton. No antioxidants were necessary for satisfactory retention of mechanical properties in hot-wet processing of the nylon fiber and the PDMAA did not affect the light stability or dyed wash fastness in draw twist yarn.

DESCRIPTION OF THE INVENTION

During the research carried out to make this invention, various polymers listed in Table I were evaluated. Because of the concern that low molecular weight polymers may leach out during polymer washing and drying and fiber laundering, copolymers containing PDMAA and small quantities of acrylic acid were also prepared for evaluation. This polymeric system was expected to react with the nylon amine end group forming a stable branched copolymer. These copolymers did not, however, produce processable nylon due to excessive cross-linking reactions (see Table III). It turned out that this modification is unnecessary due to a slow amine-amide interchange reaction that occurred with the PDMAA homopolymer during caprolactam polymerization. This reaction was sufficient to form a stable branched copolymer, which was not affected by the washing process.

Technical data from polymers containing PDMAA are listed in Tables II and III. These tables show that polymers prepared with the lower molecular weight PDMAA samples tended to have fewer amines and fewer carboxyls, particularly at longer polymerization residence times.

The decrease in amines can be explained by a relatively slow amine-amide interchange reaction. The mechanism is probably as follows:

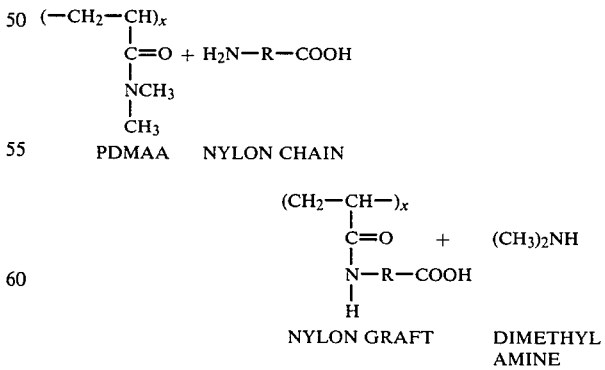

To confirm this mechanism, the effluent sweep gas was collected from a nylon polymerization containing 10% PDMAA. The analysis by gas chromatograph and mass spectrometer found 3.8 grams of dimethylamine, equivalent to 7.5% of the dimethyl amine present in the PDMAA polymer. Details of this experiment are given in Example I. This indicated that a grafting reaction occurred during polymerization. The decrease observed in carboxyls may result from the decarboxylation of any polyacrylic acid formed in the grafting reaction. Polyacrylic acid is known to decarboxylate at about 250° C.

The melt viscosity of polymers containing PDMAA is much lower than nylon homopolymers of the same formic acid viscosity (measured conventionally). This is shown in Table IV. This is consistent with the grafting reaction shown above, since graft polymers have lower melt viscosity, in which the branching segments are tightly coiled, and higher solution viscosities in which the branching segments are extended or loosely coiled than ungrafted polymers. The presence of PDMAA did not significantly lower the melting point of the nylon, nor did it significantly slow the rate of crystallization on cooling. These data are given in Table V.

Initial evaluations showed that at least 10% PDMAA in nylon was required to achieve the 13% to 14% moisture regain attributed to cotton. At this level, attempts to spin polymers containing 10% high molecular weight PDMAA resulted in filaments breaking off at the spinnerette face. In no instances, however, were there high spin pack pressures. This was true even with nylon having formic acid viscosity (FAV) of 90. When the molecular weight of the PDMAA was decreased, and the spinnerette hole length/diameter ratio increased to between 4 and 8:1, spinning performance was good. Summaries of the spinning trials and the yarn physical properties are shown in Table VI.

The moisture regains of the yarns were tested after they were scoured to remove spin finish. The data given in Table VII, show that at room temperature and 65% relative humidity, the regain of yarn with the 10% PDMAA is similar to that of scoured cotton. No change in the moisture regain was seen when the yarns were given twenty-five scouring washes.

Nylon yarns containing PDMAA were submerged in boiling water for thirty minutes, then oven dried at 150° C. The percent loss in strength was less than the control as shown in Table VIII. An antioxidant to stabilize the polymer is unnecessary. PDMAA did not affect the retention of breaking strength or of elongation after being exposed to twenty hours of carbon arc as shown in Table IX. PDMAA did not affect dyed washfastness of draw twist yarns as shown in Table X.

EXAMPLE 1

| Caprolactam | 1088 grams |
|---|---|
| Aminocaproic Acid | 52 grams |
| MnCl$_2$.4 H$_2$O | 0.0674 gram |
| H$_3$PO$_2$m 50% Solution | 0.1675 gram |
| PDMAA, Sample No. 11 (25% Solids) | 455 grams (113.75 g solids) |

The starting materials were mixed together at 90° C. and poured into a 3-liter glass reactor equipped with a heating mantle and an agitator. The melt was swept with nitrogen gas and stirred and heated to 255° C. over a one-hour period at atmospheric pressure. The melt was held at 255° C. for 3¼ hours with the nitrogen sweep.

The nitrogen gas was passed through a large flask, where much of the water vapor present in the sweep gas condensed, and then two bubblers in series which originally contained solutions of 10 cc of concentrated HCl, and 40 cc of distilled water.

After polymerization was completed the contents of condensate flask and the two bubblers were analyzed for dimethylamine by use of the gas chromatograph. A total of 3.85 grams of dimethyl amine was found; 2.8 grams in the condensate flask, 1.0 gram in the first bubbler, and 0.05 gram in the final bubbler.

The nylon polymer was extruded, washed, dried and submitted for analysis. It had a 67 FAV with 42 carboxyls and 23 amines.

| Dimethyl Amine Found, Grams | 3.85 |
|---|---|
| Dimethyl Amine Added as PDMAA: | |
| Molecular Wt. (CH$_3$)$_2$NH | 45.1 |
| Molecular Wt. CH$_2$=CHCN(CH$_3$)$_2$<br>$\phantom{xxxxxxxxxxxxxx}\|\|$<br>$\phantom{xxxxxxxxxxxxxx}$O | 99.1 |
| 113.75 g PDMAA × $\frac{45.1}{99.1}$ = 51.77 grams | |
| $\frac{3.85 \text{ grams}}{51.77 \text{ grams}}$ × 100 = 7.44% | |

The loss of 3.85 grams of dimethyl amine in 1133 grams of washed and dried polymer is 75 equivalents of amine per $10^6$ grams of polymer. Since the difference of ends in the nylon polymer is not 75, but only 19, there must have been some simultaneous loss of carboxyls. Since polyacrylic acid, a possible decomposition product, is known to lose carboxyl groups at 250°-260° C., this could explain the decrease in carboxyls.

The polymer was then extruded into water cut into pellets and washed and dried conventionally to remove water extractables such as lactam monomers, oligomers and the like.

The pellets were melted in a conventional melter and the molten polymer was pumped through a conventional spinnerette, and conventionally quenched to form fiber.

Note that a thorough discussion of N,N-(dimethylacrylamide) that its uses are found in a paper by that name, Chemical Abstracts, Vol. 83, Dec, 1975. This paper includes a thorough discussion on polymerization. However, the following example provides the method to plymerize dimethylacrylamide.

EXAMPLE 2

Dimethylacrylamide Polymerization—Materials Required:
N,N-dimethylacrylamide
Isopropyl Alcohol
Potassium Persulfate
Sodium Bisulfite Boil 580 ml of deionized water while bubbling nitrogen through the water. Then allow the boiled water to cool while passing nitrogen through the water.

Dissolve 3 grams of potassium persulfate (K$_2$S$_2$O$_8$) in 50 ml of the boiled water. Dissolve 1.5 grams of sodium bisulfite (Na$_2$HSO$_3$) and another 50 ml of the boiled water.

Pour 160 grams of dimethylacrylamide into the 480 ml of boiled water which remains. Add 20 ml of isopropyl alcohol and cool in an ice bath to 0° C.

Add 10 ml of the potassium persulfate solution and stir. Add 10 ml of the sodium bisulfite solution and stir.

Bubble nitrogen through the solution for one-half hour and then allow the solution to warm to room temperature. Then heat the solution to 50° C. for one-half hour. Allow the solution to cool, and store the solution in a dark brown bottle.

TABLE I

| PDMAA Sample Number | % Acrylic Acid | % Conc., Aqueous | Viscosity, Centipoises | Pascal · Seconds(Pa · s) |
|---|---|---|---|---|
| 1 | 0 | 100 | — | — |
| 2 | 0 | 25.4 | 20 000 | 20.000 |
| 3 | 0 | 25.4 | 354 | 0.354 |
| 4 | 0 | 25.6 | 4 000 | 4.000 |
| 5 | 0 | 25.0 | 10 000 | 10.000 |
| 6 | 2.0 | 24.5 | 175 | 0.175 |
| 7 | 5.0 | 24.6 | 200 | 0.200 |
| 8 | 0 | 25.0 | 25 | 0.025 |
| 9 | 2.0 | 25.0 | 21 | 0.021 |
| 10 | 0 | 25.5 | 74 | 0.074 |
| 11 | 0 | 25.0 | 156 | 0.156 |
| 12 | 2.5 | 25.1 | 79 | 0.079 |
| 13 | 2.5 | 25.5 | 153 | 0.153 |
| 14 | 5.0 | 25.7 | 76 | 0.076 |
| 15 | 5.0 | 25.2 | 152 | 0.152 |
| 16 | 0 | 25.6 | 76 | 0.076 |
| 17 | 0 | 25.0 | 302 | 0.302 |

TABLE II

POLYMERIZATION CONDITIONS AND PROPERTIES OF PDMMA MODIFIED NYLONS

| Nylon Polymer Number | PDMAA Sample Number | Conc. in Nylon, % | Hours at 255° C. | Extrusion Ribbon | * FAV | ** COOH | ** NH$_2$ |
|---|---|---|---|---|---|---|---|
| 1 | 1 | 10 | 1 | None | 87 | 76 | 62 |
| 2 | 1 | 4 | 2 | Fair | 96 | 62 | 60 |
| 3 | 1 | 1 | 2.6 | Good | 51 | 62 | 58 |
| 4 | 5 | 5 | 1.8 | Fair | 93 | 68 | 62 |
| 5 | 5 | 1 | 2.5 | Good | 71 | 53 | 50 |
| 6 | 4 | 10 | 1.5 | Good | 102 | 56 | 47 |
| 7 | 4 | 5 | 2.2 | Good | 90 | 59 | 58 |
| 8 | 4 | 1 | 2.5 | Good | 81 | 52 | 44 |
| 9 | 3 | 7.3 | 2.5 | Good | 54 | 56 | 42 |
| 10 | 3 | 5 | 3.3 | Good | 89 | 53 | 48 |
| 11 | 3 | 1 | 3.0 | Good | 65 | 56 | 51 |
| 12 | 8 | 6 | 7.5 | Good | 53 | 16 | 13 |
| 13 | 8 | 5 | 7 | Good | 64 | 24 | 15 |
| 14 | 10 | 10 | 5.2 | Good | 57 | 24 | 12 |
| 15 | 11 | 10 | 5.7 | Good | 74 | 23 | 15 |
| 16 | 16 | 10 | 3.5 | Good | 46 | 40 | 23 |
| 17 | 17 | 10 | 2.2 | Good | 96 | 40 | 28 |
| 18 | 10 | 10 | 6 | Good | 54 | 20 | 11 |
| 19 | 10 | 10 | 5 | Good | 55 | 63 | 18 |
| 20 | 10 | 10 | 4 | Good | 53 | 35 | 22 |
| 21 | 10 | 5 | 3 | Good | 72 | 41 | 33 |

*FAV is relative formic acid viscosity obtained by measuring the viscosity at 25° C. of a 11% solution of the polymer in formic acid (ASTM 789-62T).
**COOH indicates carboxyl groups per 10$^6$ g polymer and NH$_2$ indicates amine groups per 10$^6$ g polymer measured as in U.S. 4 356 280, Col. 4, lines 55 through 68, and column 5, lines 1 through 46, hereby incorporated by reference.

TABLE III

POLYMERIZATION CONDITIONS AND PROPERTIES OF PDMAA/ACRYLIC ACID COPOLYMERS

| Nylon Polymer Number | PDMAA Sample Number | Conc. in Nylon, % | Hours at 255° C. | Extrusion Ribbon | * FAV | ** COOH | ** NH$_2$ |
|---|---|---|---|---|---|---|---|
| C-1 | 6 | 5 | 6 | Good | 109 | 52 | 10 |
| C-2 | 6 | 1 | 2.5 | Good | 86 | 53 | 43 |
| C-3 | 7 | 5 | 5.2 | Fair | 73 | 78 | 14 |
| C-4 | 7 | 1 | 2.2 | Good | 83 | 61 | 44 |
| C-5 | 9 | 7.5 | 6.5 | None | 20 | 33 | 18 |
| C-6 | 9 | 5 | 6 | Good*** | 48 | 43 | 17 |
| C-7 | 12 | 10 | 9 | None | 24 | 52 | 21 |
| C-8 | 12 | 5 | 6 | Fair*** | 36 | 13 | 11 |
| C-9 | 13 | 10 | 9 | None | 30 | 56 | 14 |
| C-10 | 13 | 10 | 6 | None | 22 | 65 | 20 |

*FAV is relative formic acid viscosity obtained by measuring the viscosity at 25° C. of a 11% solution of polymer in formic acid (ASTM 789-62T).
**COOH indicates carboxyl groups per 10$^6$ g polymer and NH$_2$ indicates amine groups per 10$^6$ g polymer measured as in U.S. 4 356 280, supra.
***These were the only batches containing a copolymer which could be spun into yarn.

TABLE IV

MELT VISCOSITY OF NYLON POLYMERS CONTAINING PDMAA (500° F. (260° C.), 33:1 Orifice at 2 000 Seconds$^{-1}$)

| Nylon Polymer Number | PDMAA Sample Number | Conc. in Nylon, % | FAV | Viscosity, Pascal · seconds |
|---|---|---|---|---|
| Control* | — | — | 53 | 120.0 |
| C-3 | 7 | 5 | 73 | 35.0 |
| 14 | 10 | 10 | 57 | 49.0 |
| 15 | 11 | 10 | 74 | 50.5 |
| 9 | 3 | 7.3 | 54 | 80.0 |

The viscosity was measured on a Monsanto Automatic Capillary Rheometer Model 3501.
*The control polymer was an acetic acid terminated polymer containing 0.06% TiO$_2$ of about 50 FAV, 50 carboxyls and 18 amines stabilized with 8 ppm of manganese and 10 ppm of phosphorus.

TABLE V

| | DSC ANALYSIS OF NYLON CONTAINING PDMAA | | | | |
|---|---|---|---|---|---|
| Polymer Number | Conc. of PDMAA Sample Number | Tm, °C. | Tg, °C. | Tch, °C. | Tcc, °C. |
| NO* | 0 | 223 | 36 | 65 | 176 |
| Control | 0** | 225 | 40 | 66 | 174 |
| 14 | 10% of No. 10 | 222 | 41 | 69 | 172 |
| 15 | 10% of No. 11 | 222 | 41 | 69 | 173 |
| 21 | 5% of No. 10 | 224 | 39 | 69 | 175 |

*NO is polymer without additive or stabilizers of about 55 FAV, 55 carboxyls and 55 amines.
**The control polymer is an acetic acid terminated polymer containing 0.06% TiO$_2$ of about 50 FAV, 50 carboxyls and 18 amines stabilized with 8 ppm of manganese and 10 ppm of phosphorus.
The DSC (Differential Scanning Calorimeter) analysis was performed on a duPont Model 1090 Thermal Analyzer. The solid polymer was heated in nitrogen at the rate of 10° C. per minute. The temperature at the peak of the endotherm was taken as the melting point, Tm. The temperature was raised to 255° C. and held for five minutes. It was then quenched in liquid nitrogen to produce an amorphous solid. The polymer was then heated at 10° C. per minute. The temperature at which the heat flow increased, before becoming steady again, was taken as the glass transition temperature, Tg. The heating was continued at 10° C. minute. The temperature at the peak of the exotherm was taken as the temperature of crystallization on heating, Tch. The heating was continued to 255° C. and then cooled at 10° C. per minute. The temperature at the peak of the exotherm was taken as the temperature of crystallization on cooling Tcc.

TABLE VI

SPINNING CONDITIONS AND YARN PHYSICAL PROPERTIES

| Nylon Polymer Number | Conc. & PDMAA Sample | Spin Temp., °C. | Pot Pressure, psig | Pot Pressure, kPa | * FAV | ** % UE | ** UTS gpd | mN/ dtex | % Shrinkage |
|---|---|---|---|---|---|---|---|---|---|
| Control | | 275 | 2200 | 15 200 | 45 | 61 | 5.4 | 48 | 17 |
| 10 | 6% of No. 8 | 275 | 2000 | 13 800 | 53 | 59 | 4.4 | 39 | 21 |

TABLE VI-continued
SPINNING CONDITIONS AND YARN PHYSICAL PROPERTIES

| Nylon Polymer Number | Conc. & PDMAA Sample | Spin Temp., °C. | Pot Pressure, psig | Pot Pressure, kPa | FAV * | % UE ** | UTS gpd | mN/ dtex | % Shrinkage |
|---|---|---|---|---|---|---|---|---|---|
| Control | | 268 | 750 | 5200 | 40 | 55 | 4.4 | 39 | 18 |
| C6 | 5% of No. 9 | 263 | 600 | 4100 | 48 | 48 | 3.6 | 32 | 20 |
| 13 | 5% of No. 8 | 273 | 1050 | 7200 | 64 | 57 | 4.1 | 36 | 22 |
| Control | | 276 | 500 | 3400 | 45 | 65 | 4.5 | 40 | 17 |
| 14 | 10% of No. 10 | 275 | 400 | 2800 | 57 | 38 | 2.8 | 25 | 25 |
| 15 | 10% of No. 11 | 276 | 500 | 3400 | 74 | 53 | 3.1 | 27 | 25 |
| 21 | 5% of No. 10 | 276 | 1150 | 7900 | 72 | 60 | 4.1 | 36 | 21 |
| Control | | 270 | 700 | 4800 | 45 | 54 | 4.6 | 41 | 16 |
| 18 | 10% of No. 10 | 274 | 500 | 3400 | 54 | 56 | 3.1 | 27 | 21 |
| 19 | 10% of No. 10 | 271 | 500 | 3400 | 55 | 49 | 2.9 | 26 | 21 |
| 20 | 10% of No. 10 | 270 | 500 | 3400 | 53 | 52 | 3.1 | 27 | 20 |
| Control | | 264 | 1300 | 9000 | 45 | 54 | 4.7 | 41 | — |
| C8 | 5% of No. 12 | 265 | 1800 | 12 400 | 36 | 20 | 2.8 | 25 | — |
| 16 | 10% of No. 16 | 265 | 1400 | 9700 | 46 | 37 | 3.0 | 26 | — |

All cross sections were round; draw ratios 3.0; and deniers 110/30.
*FAV is relative formic acid viscosity obtained by measuring the viscosity at 25° C. of a 11% solution of polymer in formic acid (ASTM 789-62T).
**UE is ultimate elongation, %.
UTS is ultimate tensile strength in grams per denier and millinewtons/decitex.

TABLE VII
YARN MOISTURE REGAIN

| Polymer Number | Concentration and PDMAA Sample Number | Moisture Regain, % 65% RH at 68° F. (18° C.) | Moisture Regain, % 95% RH at 90° F. (32° C.) |
|---|---|---|---|
| Control* | | 4–5 | 7–8 |
| 12 | 6% of No. 8 | 5–6 | 9–10 |
| Control* | | 4–5 | 7–8 |
| 14 | 10% of No. 10 | 6–7 | 13–14 |
| 15 | 10% of No. 11 | 6–7 | 13–14 |
| 21 | 5% of No. 10 | 5–6 | 10–11 |
| Control* | | 4–5 | 7–8 |
| 18 | 10% of No. 10 | 6–7 | 13–14 |
| 19 | 10% of No. 10 | 6–7 | 13–14 |
| 20 | 10% of No. 10 | 6–7 | 13–14 |

All yarns were scoured once, AATCC 96 II E, to remove finish oils. The test method is described in ASTM Procedure D885, Section 10.
*The control is an is acetic acid terminated polymer containing 0.06% TiO$_2$ of about 50 FAV, 50 carboxyls and 18 amines stabilized with 8 ppm of manganese and 10 ppm of phosphorus.

TABLE VIII
YARN STABILITY
YARN BREAKING STRENGTH AFTER HOT/WET TREATMENT 110/30 YARN, ROUND CROSS SECTION

| Nylon Polymer Number | Conc. & PDMAA Sample No. | Un-treated | Breaking Strength, Grams Treated (1) | % | (2) | % | (3) | % |
|---|---|---|---|---|---|---|---|---|
| Control* | | 455 | 337 | 74 | 337 | 74 | 301 | 66 |
| 14 | 10% of #10 | 285 | 247 | 86 | 263 | 92 | 237 | 83 |
| 15 | 10% of #11 | 297 | 251 | 85 | 259 | 87 | 226 | 76 |
| 21 | 5% of #10 | 395 | 357 | 90 | 362 | 92 | 287 | 73 |

(1) Exposed to boiling water 30 minutes and dried in an air oven 10 minutes at 150° C.
(2) Exposed to boiling water 30 minutes and dried in an air oven 20 minutes at 150° C.
(3) Exposed to boiling water 30 minutes and dried in an air oven 30 minutes at 150° C.

TABLE IX
LIGHT STABILITY, CARBON ARC

| Polymer Number | Conc. and PDMAA Sample Number | Initial UE ** % | Initial UTS, ** gpd | Initial m/N dtex | 10 Hours UE % | 10 Hours UTS, gpd | 10 Hours m/N dtex | 20 Hours UE ** % | 20 Hours UTS, ** gpd | 20 Hours m/N dtex |
|---|---|---|---|---|---|---|---|---|---|---|
| Control* | | 26 | 4.8 | 42 | 24 | 5.1 | 45 | 45 | 25 | 44 |
| 14 | 10% of No. 10 | 22 | 3.6 | 32 | 20 | 3.7 | 33 | 33 | 21 | 31 |
| 15 | 10% of No. 11 | 24 | 3.5 | 31 | 21 | 3.4 | 30 | 30 | 20 | 31 |
| 21 | 5% of No. 11 | 24 | 4.5 | 40 | 24 | 4.8 | 42 | 42 | 23 | 40 |

The test method is that described in AATCC Test Model 111C-1978 but without the humidity control.
*The control is an acetic acid terminated polymer containing 0.06% TiO$_2$ of about 50 FAV, 50 carboxyls and 18 amines stabilized with 8 ppm of manganese and 10 ppm of phosphorus.
**UE is ultimate elongation, %.
UTS is ultimate tensile strength in grams per denier and millinewtons per decitex.

TABLE X

CROSS STAINING AND DYED WASHFASTNESS OF YARNS CONTAINING PDMAA BY AATCC TEST 61-1975 IIIA (GRAY SCALE)

| Nylon Polymer Number | Conc. and PDMAA Sample Number | Staining Nylon | Cotton | Shade Change |
|---|---|---|---|---|
| Control | 0 | 4–5 | 5 | 3 |
| 14 | 10% of No. 10 | 4 | 5 | 3–4 |
| 15 | 10% of No. 11 | 4 | 5 | 3–4 |
| 21 | 5% of No. 10 | 3–4 | 5 | 3 |

All yarns were 110/20 round cross section. They were dyed with 0.,13% Telon fast violet A-BB (Acid Violet 103), and then washed for 45 minutes at 120° F. (49° C.) using the AATCC standard detergent.

We claim:

1. A nylon fiber, useful for improved comfort for wearers of apparel fabric made therefrom comprising a graft copolymer of nylon on poly(N,N-dimethylacrylamide) of (a) from about 5 to 15% by weight of poly(N,N-dimethylacrylamide) having a molecular weight which in a 25% aqueous solution gives a viscosity of from about 20 to 1000 centipoise at 25° C. and (b) correspondingly from about 85 to 95% by weight nylon.

* * * * *